United States Patent [19]

Lin et al.

[11] Patent Number: 5,072,324
[45] Date of Patent: Dec. 10, 1991

[54] THIN FILM TRANSDUCER/TRANSFORMER ASSEMBLY

[75] Inventors: Fong-Jei Lin; Shengbo Zhu, both of San Jose, Calif.

[73] Assignee: Magnex Corporation, San Jose, Calif.

[21] Appl. No.: 463,567

[22] Filed: Jan. 11, 1990

[51] Int. Cl.⁵ .................................................. G11B 5/127
[52] U.S. Cl. ..................................... 360/126; 360/123
[58] Field of Search ............... 360/123, 126, 127, 128, 360/122

[56] References Cited

U.S. PATENT DOCUMENTS

| | | | |
|---|---|---|---|
| 4,317,149 | 2/1982 | Elser et al. | 360/126 |
| 4,458,279 | 7/1984 | Katz | 360/123 |
| 4,745,506 | 5/1988 | Nakamura et al. | 360/126 |
| 4,787,003 | 11/1988 | Nakamura et al. | 360/123 |
| 4,927,804 | 5/1990 | Ziera et al. | 360/126 |

FOREIGN PATENT DOCUMENTS 0032219  2/1983  Japan ................... 360/123

*Primary Examiner*—David J. Severin
*Attorney, Agent, or Firm*—Townsend & Townsend

[57] ABSTRACT

A thin film transducer/transformer assembly includes a thin film magnetic transducer assembly formed at a first location on a support surface of a substrate and a thin film transformer assembly formed at a second location of the support surface of the substrate. The transducer assembly and the transformer assembly are each provided with electrically conductive coils which are mutually coupled by electrically conductive paths extending therebetween.

The transducer assembly includes a bottom pole member, a top pole member and an electrically conductive coil partially located between the top and bottom pole members. The pole members are mutually coupled at the back gap regions thereof and have pole ends which are mutually spaced and insulated.

The transformer assembly includes a bottom pole member, a top pole member forming a closed magnetic path with the bottom pole member, the top and bottom pole members fabricated of a magnetically permeable material, and an electrically conductive coil positioned between the top and bottom pole members. The coil has a pair of ends and a tap connection located between the ends. The pole members are mutually coupled at opposing ends and centrally thereof by means of a downwardly depending central portion extending from the top pole member to the intermediate portion of the bottom pole member.

The transducer coil and the transformer coil are electrically coupled in such a way that the output signal supplied by the transformer coil is an electrically boosted signal of greater amplitude than the signal generated by the transducer coil.

30 Claims, 3 Drawing Sheets

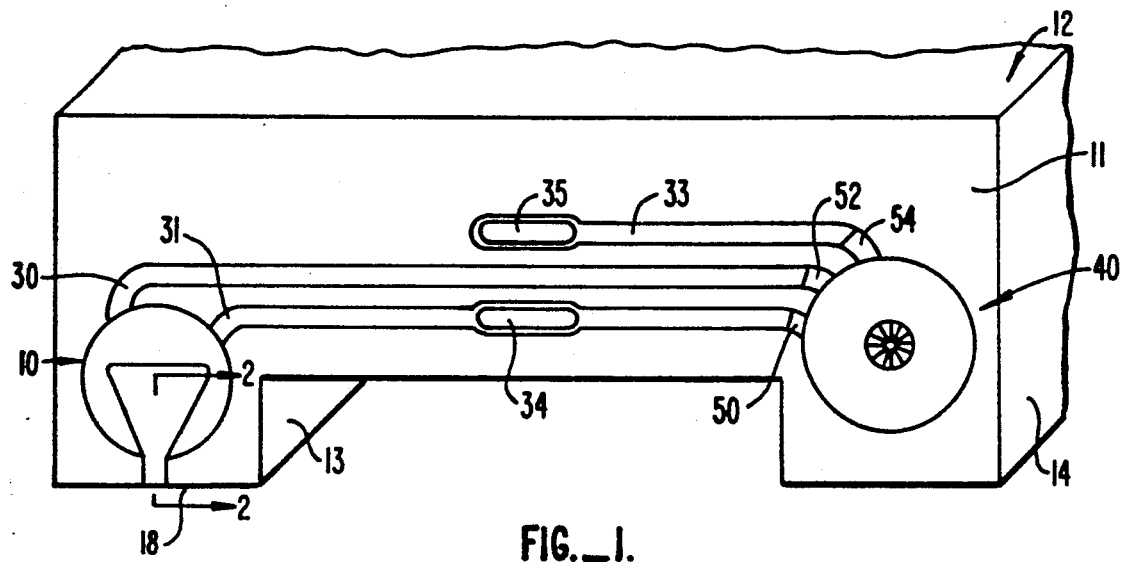
FIG._1.
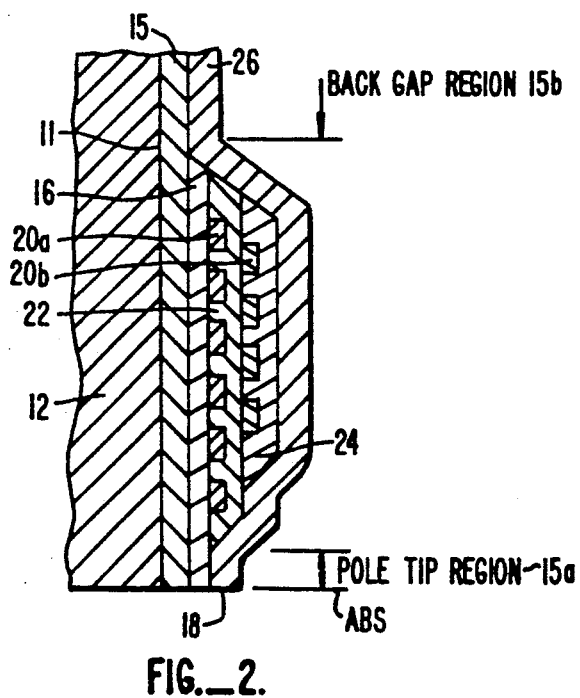
FIG._2.
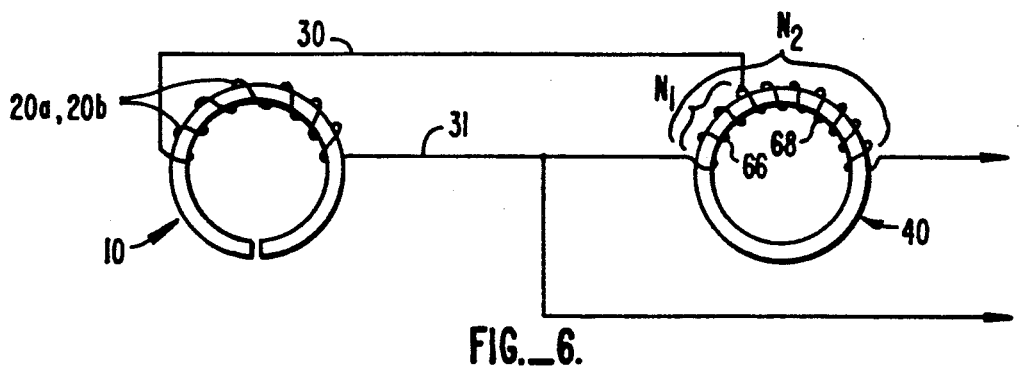
FIG._6.

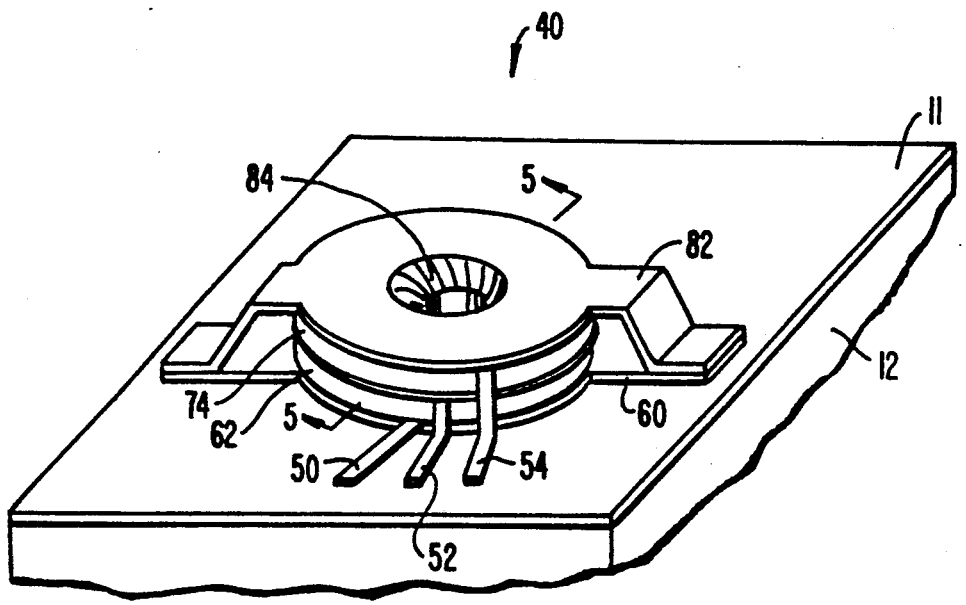
FIG._3.
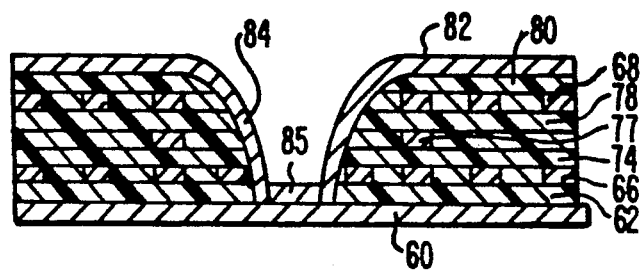
FIG._5.

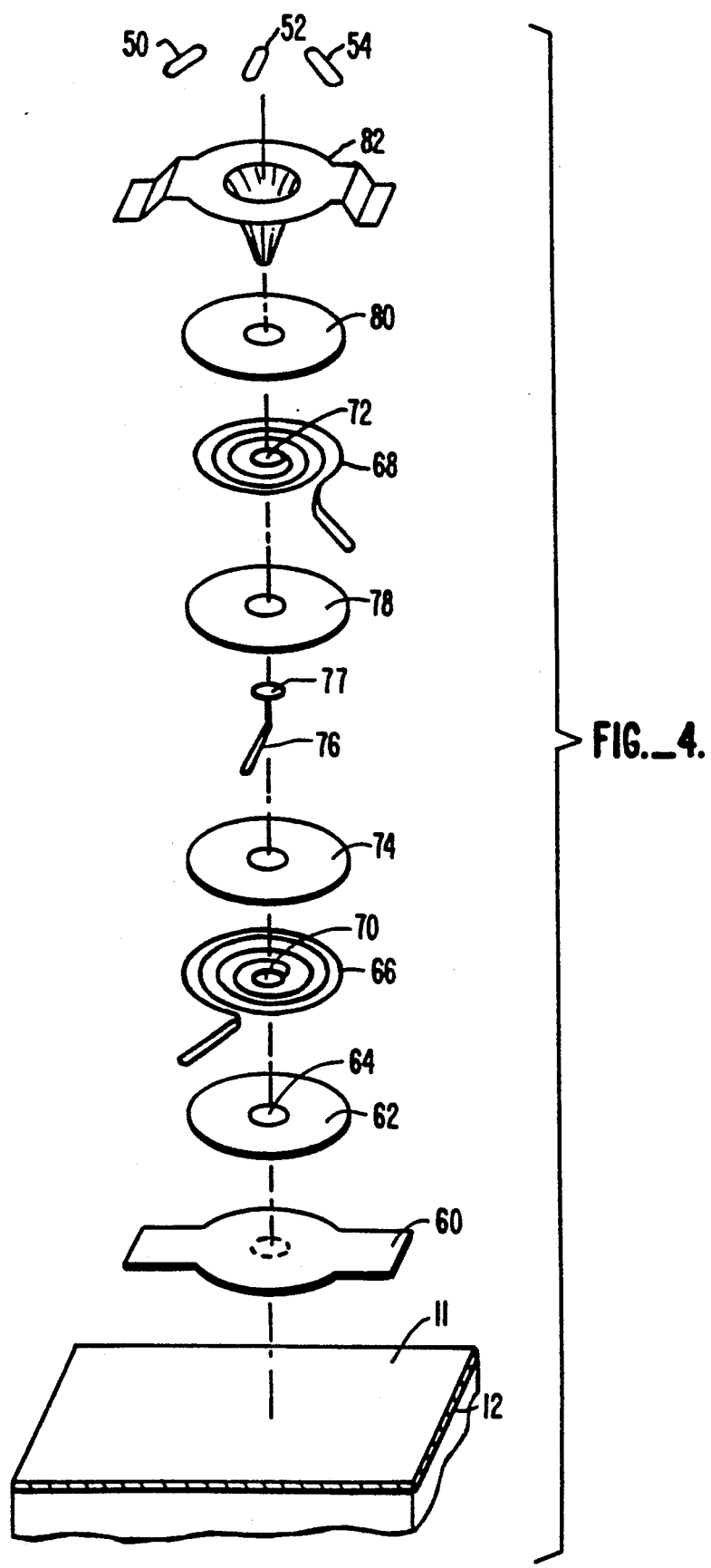
FIG._4.

THIN FILM TRANSDUCER/TRANSFORMER ASSEMBLY

BACKGROUND OF THE INVENTION

This invention relates to thin film transducers of the type found in small computer disk drives.

Thin film magnetic transducers are known which are used in disk drives to write data to and read data from magnetic storage disks. A typical thin film transducer comprises a pair of pole pieces joined at a first region, usually termed the back gap region, and spaced at an opposing region, usually termed the pole tip region. In between the back gap region and the pole tip region, the pole pieces diverge in order to accommodate an electrical coil which is electrically insulated from the pole pieces. The coil is electrically connected to associated read/write circuitry. The transducer is typically fabricated on a relatively thick substrate, usually termed a slider, with the pole tip region terminating at a surface termed the air bearing surface (ABS). A typical example of such a transducer is described and illustrated in U.S. Pat. No. 4,458,279 and the additional references cited therein, the disclosures of which are hereby incorporated by reference.

Typically, a pair of such thin film transducers is fabricated on the slider surface, with each transducer located at a different end of the slider surface adjacent a lobe defined by a rail extending the entire length of the slider. Thus, in a given assembly the slider has a pair of rails running mutually parallel along the length of the slider and a thin film transducer is associated to the lobe defined by the associated rail.

The demand for increasing data density on magnetic media has lead to the requirement for substantially smaller track widths and transducers with correspondingly smaller pole tip regions. With decreasing pole tip size, the amplitude of the signal output by the transducer coil is correspondingly reduced. This is undesirable, since noise signals increasingly mask the data signals generated by the coils during a read operation, which leads to erroneous data retrieval. In the past, attempts have been made to compensate for this decrease in signal amplitude by adding more turns to a transducer coil. This solution is less than desirable, however, since it leads to an increased thickness of the transducer: in particular, in order to accommodate more turns, the coil is fabricated in several layers. This increased thickness of the transducer is highly undesirable because of a corresponding increase in noise, resistance and power consumption. Moreover, additional process steps are required, which increase production cycle time and decrease the yield rate, thereby contributing to higher cost per unit.

SUMMARY OF THE INVENTION

The invention comprises a thin film transducer/transformer assembly and a method of manufacturing such an assembly which enables the physical size of the transducer pole tip to be substantially reduced without sacrificing reliability in the electrical signal generated by the transducer.

From an apparatus standpoint the invention comprises a substrate providing a support surface, a thin film magnetic transducer formed at a first location of the support surface, a thin film transformer formed at a second location of the support surface, and means for providing electrical coupling between the transducer and the transformer. The substrate support surface is preferably provided with a pair of laterally spaced lobes, and the transducer is formed adjacent one of the lobes while the transformer is located adjacent the other one of the lobes. The electrical coupling means preferably comprises a pair of electrically conductive leads extending between the transducer and the transformer.

The transducer includes an electrically conductive coil having a pair of ends, and the transformer includes a coil having a pair of ends and a tap connection between those ends. The coupling means includes a first conductive path coupled between one of the transducer coil ends and one of the transformer coil ends, and a second conductive path coupled between the other one of the transducer coil ends and the tap connection of the transformer coil. The output signals from the transducer/transformer assembly are taken from the ends of the transformer coil. The transformer coil serves to boost the amplitude of the signal generated by the transducer coil, with the amount of amplitude boost being dependent upon the turns ratio of the two portions of the transformer coil.

The transformer includes a bottom pole member, a top pole member forming a closed magnetic path with the bottom pole member, with the top and bottom pole members being fabricated of a magnetically permeable material, and an electrically conductive coil positioned between the top and bottom pole members, the coil having a pair of ends and a tap connection between the ends. The bottom pole member preferably includes first and second end portions and an intermediate body portion extending therebetween; the top pole member preferably includes first and second end portions and an intermediate body portion extending therebetween and disposed above the intermediate body portion of the bottom pole member to provide an interior space for accommodating the coil, and the first and second end portions of the bottom pole member are coupled to the first and second end portions of the top pole member, respectively. The intermediate body portion of the top pole member preferably includes a downwardly depending central portion extending to the intermediate body portion of the bottom pole member, and the transformer coil is preferably disposed about the central portion of the top pole member. If one of the transformer pole members is electrically conductive, the tap connection is electrically coupled to that electrically conductive pole member; alternatively, the tap connection includes a separate tap element having an externally accessible end portion.

The thin film magnetic transducer includes a bottom pole member having a back gap end and a pole end, a top pole member having a back gap end and a pole end, the top and bottom pole members being mutually coupled at the back gap ends thereof, the pole ends being mutually spaced, a coil having a plurality of turns passing between the top and bottom pole members, and means for electrically insulating the coil from the pole members.

From a method standpoint, the invention comprises the steps of providing a substrate having a support surface, forming a thin film magnetic transducer at a first location of the support surface, forming a thin film transformer at a second location of the support surface, and forming an electrically conductive coupling between the transducer and the transformer. The thin film magnetic transducer is preferably constructed by forming a magnetically permeable bottom pole member with a back gap end and a pole end, forming an electrically conductive coil over the bottom pole member and enclosing the back gap end, and forming a top pole member with a back gap end coupled to the back gap end of the bottom pole member and a pole end spaced from the pole end of the bottom pole member.

The transformer is preferably fabricated by forming a bottom pole member of a magnetically permeable material, forming a coil structure over the bottom pole member in mutually spaced fashion, and forming a top pole member over the coil structure with portions of the top pole member coupled to corresponding portions of the bottom pole member to form a closed magnetic path with a leg portion surrounded by the coil structure. The coil structure is fabricated preferably by forming a first insulating layer over the bottom pole member, forming a first coil segment over the first insulating layer, forming a second insulating layer over the first coil segment, forming a second coil segment over the second insulating layer, and forming a third insulating layer over the second coil segment. The embodiment having a separate center tap is fabricated by preceding the step of forming a second coil segment with the steps of forming a center tap element over the second insulating layer, and forming a fourth insulating layer over the center tap element. During formation of the thin film transformer, certain portions of the bottom pole member corresponding to certain portions of the to-be-formed top pole member are exposed, and the top pole member is formed by depositing a magnetically permeable material over the coil structure so that the top pole member, when formed, includes magnetically permeable material contacting the exposed corresponding portions of the bottom pole member and extending between the exposed portions of the bottom pole member over the coil structure. A plurality of externally accessible contact pads coupled to the coil structure in a predetermined fashion are also provided during fabrication of the transformer.

The thin film transducer/transformer assembly can be fabricated using standard photolithographic/deposition techniques of the type used in thin film transducer processing, with corresponding portions of the transducer and the transformer being simultaneously fabricated using appropriate masks. Further, batch processing is preferably employed so that several transducer/transformer assemblies are fabricated on the same substrate, followed by separation into individual assemblies. Thus, each assembly can be fabricated at relatively low cost using standardized techniques providing relatively high yields. The inclusion of the transformer in the electrical circuit between the transducer and the follow-on electronic circuitry enables a relatively small transducer to be used for read/write operations without sacrificing the signal-to-noise ratio due to the signal amplitude boost afforded by the transformer.

For a fuller understanding of the nature and advantages of the invention, reference should be had to the ensuing detailed description taken in conjunction with the accompanying drawings.

BRIEF DESCRIPTION OF THE DRAWINGS

FIG. 1 is an isometric representation viewed from the upstream side of a slider depicting the novel structure of the invention;

FIG. 2 is an enlarged sectional view illustrating the thin film transducer taken along lines 2—2 of FIG. 1;

FIG. 3 is a perspective view of the thin film transformer;

FIG. 4 is an exploded view of the transformer;

FIG. 5 is an enlarged sectional view illustrating the transformer taken along lines 5—5 of FIG. 3; and FIG. 6 is an electrical diagram showing the coupling between the transducer and the transformer.

DESCRIPTION OF THE PREFERRED EMBODIMENTS

Turning now to the drawings, FIG. 1 illustrates the preferred embodiment of the invention. As seen in this Fig., a thin film magnetic transducer generally designated with reference numeral 10 and a thin film transformer generally designated with reference numeral 40 are formed on a support surface 11 of a slider 12. Slider 12 includes first and second air bearing rails 13, 14 which are integrally formed with the slider 12 and which provide air bearing surfaces for supporting the slider 12 above a moving magnetic disk (not shown) in a known manner.

As best seen in FIG. 2, thin film transducer 10 includes a first layer of magnetic film material forming a first magnetic pole piece 15 disposed on surface 11 of slider substrate 12. First magnetic pole piece 15 is typically of uniform thickness between at least a pole tip region 15a and a back gap region 15b. A first layer of nonmagnetic insulating material 16 such as silicon dioxide or alumina is deposited over pole piece 15 and extends from pole tip region 15a to back gap region 15b.

A first layer of electrically conductive material forming a conductive coil winding 20a is deposited in an appropriate pattern, such as rectangular, circular or elliptical, over the layer of insulating material 16. A second layer of insulating material 22 of sufficient thickness to cover winding 20a is deposited over insulating layer 16. A second layer of electrically conductive material forming a further conductive coil winding 20b is deposited in a suitable pattern over the layer of insulating material 22. A third insulating layer 24 covers the second winding 20b. First and second windings 20a and 20b are connected to form a two layer continuous coil which loops around the back gap region 15b to enclose the region 15b.

A second layer of magnetic material forming a second magnetic pole piece 26 is deposited over first pole piece 15 in the back gap region 15b, over insulating layers 22 and 24 in the regions occupied by conductive windings 20a and 20b and over insulating layer 16 in the pole tip region 15a. Pole pieces 15 and 26 are separated at the pole tip region by insulating layer 16 in order to provide a transducing gap therebetween. One end of first winding 20a and one end of second winding 20b are electrically coupled to the first end of separate electrically conductive paths 30, 31 (FIG. 1) in order to electrically connect the coil of the transducer 10 to the coil in transformer 40, as described more fully below.

With reference to FIGS. 3-5, transformer 40 includes a bottom magnetic pole or bar 60, an upper magnetic pole or bar 82 joined to lower bar 60 at the edges and the center thereof, a pair of electrically conductive coil segments 66, 68, an electrically conductive center tap element 76 and a plurality of electrically insulative spacers 62, 74, 78 and 80. The lower coil segment 66 is coupled to a first contact pad 50; the center tap element 76 is coupled to a second contact pad 52; and coil segment 68 is coupled to a third contact pad 54.

As best seen in FIG. 5, upper magnetic bar 82 has a central downwardly depending portion 84 generally cylindrical in configuration which passes through the central apertures 70, 72 in coil segments 66, 68, and through central aperture 77 in center tap element 76. Central element 84 terminates in a bottom portion 85 which directly contacts the bottom magnetic bar 60 in order to provide a closed magnetic path therebetween. Central portion 84 is electrically insulated from the coil segments 66, 68 and center tap element 76 in the embodiment depicted in FIG. 5. As can be appreciated by those skilled in the art, if bottom bar 60 or top bar 82 are fabricated from material which is not only magnetically permeable but also electrically conductive, center tap element 77 can be eliminated and the tap provided by establishing an electrical connection between the inner ends of coil segments 66, 68 and one or both of the bars 60, 82. Alternatively, the tap can be taken from some point along either coil segment 66 or 68 to one or both of the bars 60, 82.

As best shown in FIG. 6, the coil segments 20a, 20b of thin film transducer 10 are electrically connected to coil segment 66 of transformer 40 via conductive leads 30, 31; while the output connections to the follow-on electronic circuitry (not shown) are taken from the non-common ends of coil segments 66 and 68 along conductive paths 31, 33. To facilitate connection to the external circuitry, enlarged electrical contact areas 34, 35 are provided as shown.

As will be appreciated by those skilled in the art, transformer 40 is used to modify the signals generated by transducer 10 on conductive paths 30, 31 during a read operation. More particularly, the voltage level of the signals from transducer 10 is stepped up or boosted by transformer 40. The amount of boost in the signal level is determined by the turns ratio of the coil segments 66, 68. With the configuration depicted in FIG. 6, the number of turns N1 on the signal input side is simply the number of turns in coil segment 66, while the number of turns N2 on the signal output side is the combined value of the number of turns in coil segment 66 and coil segment 68. These numerical values can be determined in an empirical fashion for any given application.

As will be appreciated by those skilled in the art, the fabrication of thin film transducer 10 and thin film transformer 40 can be done simultaneously to form the transducer/transformer assembly described above. Moreover, the fabrication of the transducer 10 and transformer 40 is performed using thin film processing steps which are well known to those skilled in the art. In particular, substrate 12 is initially provided, after which the bottom pole 15 of transducer 10 and the bottom pole 60 of transformer 40 are formed by initial deposition of a suitable magnetically permeable material such as nickel iron to a prescribed thickness, followed by selective photomask patterning and etching. Next, first insulation layers 16 and 62 are formed by depositing an insulation layer, such as silicon dioxide, followed by photomask patterning and etching. Alternatively, a photoresist layer is coated onto the bottom poles 15, 60 and substrate 12 followed by photomask patterning and hard bake (solidification). Next, first coil segments 20a and 66 are fabricated from a suitable conductive material, such as copper, silver, gold or the like, by first depositing a thin film seed layer to a thickness on the order of about 200 Å, followed by deposition of the conductive material to a suitable thickness, photomask patterning, soft bake and plating, followed by photoresist strip and seed layer etching. Second insulation layers 22, 74 are next formed, followed by formation of the center tap lead 76 and insulation layer 78 of transformer 40 (where employed), coil segments 20b, 68, insulation layers 24, 80 and top magnetic pole pieces 26, 82. During formation of the insulative layer 22, a suitable aperture is provided (not shown) to provide electrical connection between appropriate ends of the coil segments; similarly, during formation of coil segments 66, 68 and center tap element 76, apertures 70, 72 and 77 are etched to provide a central opening for accommodating the central region 84 of top bar 82. In addition, apertures are formed in insulation layers 74, 78 of transformer 40 in order to provide ohmic contact between the center tap element 76 and the inner ends of coil segments 66, 68. After the formation of the conductive paths 30, 31 and 33, and the contact pads 34, 35, a protective layer such as alumina (not illustrated) is deposited on the top of the now formed transducer/transformer assembly.

As will now be apparent, the transducer/transformer assembly can be fabricated using standard integrated circuit or thin film transducer batch fabrication techniques, thus providing great economies of scale so that the individual assemblies can be produced at a favorably low cost with relatively high yield. The inclusion of the transformer 40 in the assembly permits a transducer 10 with smaller pole tip dimensions to be employed without sacrificing signal amplitude and thus signal reliability. For example, for a transducer 10 having a coil segment 20a with 17 turns and a coil segment 20b of 15 turns, for a total of 32 turns, the use of a transformer having a turns ratio of 2:1 has the same effect on signal amplitude as fabricating a 64 turn transducer coil.

While the above provides a complete and adequate description of the preferred embodiments of the invention, various modifications, alternate constructions and equivalents will occur to those skilled in the art. For example, although the invention has been disclosed with the transducer 10 on the left lobe 13 and the transformer 40 on the right lobe 14 of the slider 12, assemblies in which the locations of the transducer 10 and transformer 40 are reversed are envisioned. Therefore, the above should not be construed as limiting the invention, which is defined by the appended claims.

What is claimed is:

1. A thin film transducer/transformer assembly comprising:
   a substrate providing a support surface having a pair of laterally spaced lobes;
   a thin film magnetic transducer formed at a first location adjacent one of said pair of lobes of said support surface;
   a thin film transformer formed at a second location adjacent the other one of said pair of lobes of said support surface; and
   means for providing electrical coupling between said transducer and said transformer.

2. The invention of claim 1 wherein said electrical coupling means comprises a pair of electrically conductive leads extending between said transducer and said transformer.

3. The invention of claim 1 wherein said transducer includes an electrically conductive coil having a pair of ends, said transformer includes a coil having a pair of ends and a tap connection between said ends; and wherein said coupling means includes a first conductive path coupled between one of said transducer coil ends and one of said transformer coil ends and a second conductive path coupled between the other one of said transducer coil ends and said tap connection of said transformer coil.

4. The invention of claim 1 wherein said thin film magnetic transducer includes a bottom pole member having a back gap end and a pole end, a top pole member having a back gap end and a pole end, said top and bottom pole members being mutually coupled at the back gap ends thereof, said pole ends being mutually spaced, a coil having a plurality of turns passing between said top and bottom pole members, and means for electrically insulating said coil from said pole members.

5. The invention of claim 1 wherein said transformer includes a bottom pole member, a top pole member forming a closed magnetic path with said bottom pole member, said top and bottom pole members fabricated of a magnetically permeable material, and an electrically conductive coil positioned between said top and bottom pole members, said coil having a pair of ends and a tap connection between said ends, said tap connector and one of said pair of ends being coupled to said electrical coupling providing means.

6. The invention of claim 5 wherein at least one of said pole members is electrically conductive; and wherein one of said coil ends is electrically coupled to said electrically conductive pole member.

7. The invention of claim 5 wherein said tap connection includes a tap element having an externally accessible end portion.

8. The invention of claim 5 wherein said pole members are mutually coupled at opposing ends and centrally thereof.

9. The invention of claim 8 wherein said pole members are mutually coupled centrally by means of a centrally arranged portion of one of said pole members extending to the other one of said pole members.

10. The invention of claim 5 wherein said bottom pole member has first and second end portions and an intermediate body portion extending therebetween; and wherein said top pole member has first and second end portions and an intermediate body portion extending therebetween and disposed above the intermediate body portion of said bottom pole member to provide an interior space for accommodating said coil, said first and second end portions of said bottom pole member being coupled to said first and second end portions of said top pole member, respectively.

11. The invention of claim 10 wherein said intermediate body portion of said top pole member has a downwardly depending central portion extending to said intermediate body portion of said bottom pole member.

12. The invention of claim 11 wherein said coil is disposed about said central portion of said top pole member.

13. A method of fabricating a thin film transducer/transformer assembly comprising the steps of:
 (a) providing a substrate having a support surface with a pair of laterally spaced lobes;
 (b) forming a thin film magnetic transducer at a first location adjacent one of said pair of lobes of the support surface;
 (c) forming a thin film transformer at a second location adjacent the other one of said pair of lobes of said support surface; and
 (d) forming an electrically conductive coupling between the transducer and the transformer.

14. The method of claim 13 wherein said step (b) of forming includes the steps of (i) forming a magnetically permeable bottom pole member with a back gap end and a pole end; (ii) forming an electrically conductive coil over the bottom pole member and enclosing the back gap end; and (iii) forming a top pole member with a back gap end coupled to the back gap end of the bottom pole member and a pole end spaced from the pole end of the bottom pole member.

15. The method of claim 13 wherein said step (c) of forming includes the steps of (i) forming a bottom pole member of a magnetically permeable material; (ii) forming a coil structure over the bottom pole member in mutually spaced fashion; and (iii) forming a top pole member over the coil structure with portions of the top pole member coupled to corresponding portions of the bottom pole member to form a closed magnetic path with a leg portion surrounded by the coil structure.

16. The method of claim 15 wherein said step (iii) of forming includes the steps of exposing the corresponding portions of the bottom pole member, and depositing a magnetically permeable material over the coil structure so that the top pole member includes magnetically permeable material contacting the exposed corresponding portions of the bottom pole member and extending between the exposed portions of the bottom pole member over the coil structure.

17. The method of claim 15 further including the step of providing a plurality of externally accessible contact pads over the substrate and coupled to the coil structure in a predetermined fashion.

18. The method of claim 15 wherein said step (ii) of forming includes the steps of forming a first insulating layer over the bottom pole member; forming a first coil segment over the first insulating layer; forming a second insulating layer over the first coil segment; forming a second coil segment over the second insulating layer; and forming a third insulating layer over the second coil segment.

19. The method of claim 18 wherein said step of forming a second coil segment is preceded by the steps of forming a center tap element over the second insulating layer and forming a fourth insulating layer over the center tap element.

20. A thin film transducer/transformer assembly comprising:
 a substrate providing a support surface;
 a thin film magnetic transducer formed at a first location of said support surface, said transducer including an electrically conductive coil having a pair of ends;
 a thin film transformer formed at a second location of said support surface, said transformer including a coil having a pair of ends and a tap connection between said ends; and
 means for providing electrical coupling between said transducer and said transformer, said coupling means including a first conductive path coupled between one of said transducer coil ends and one of said transformer coil ends and a second conductive path coupled between the other one of said transducer coil ends and said tap connection of said transformer coil.

21. The invention of claim 20 wherein said transformer includes a bottom pole member and a top pole member forming a closed magnetic path with said bottom pole member, said top and bottom pole members being fabricated of a magnetically permeable material; and wherein said transformer coil is positioned between said top and bottom pole members.

22. The invention of claim 21 wherein at least one of said pole members is electrically conductive; and wherein one of said coil ends is electrically coupled to said electrically conductive pole member.

23. The invention of claim 21 wherein said pole members are mutually coupled at opposing ends and centrally thereof.

24. The invention of claim 23 wherein said pole members are mutually coupled centrally by means of a centrally arranged portion of one of said pole members extending to the other one of said pole members.

25. The invention of claim 21 wherein said bottom pole member has first and second end portions and an intermediate body portion extending therebetween; and wherein said top pole member has first and second end portions and an intermediate body portion extending therebetween and disposed above the intermediate body portion of said bottom pole member to provide an interior space for accommodating said coil, said first and second end portions of said bottom pole member being coupled to said first and second end portions of said top pole member, respectively.

26. The invention of claim 25 wherein said intermediate body portion of said top pole member has a downwardly depending central portion extending to said intermediate body portion of said bottom pole member.

27. The invention of claim 26 wherein said coil is disposed about said central portion of said top pole member.

28. A method of fabricating a thin film transducer/transformer assembly comprising the steps of:
 (a) providing a substrate having a support surface;
 (b) forming a thin film magnetic transducer at a first location of the support surface;
 (c) forming a thin film transformer at a second location of said support surface by (i) forming a bottom pole member of a magnetically permeable material, (ii) forming a coil structure over the bottom pole member in mutually spaced fashion by forming a first insulating layer over the bottom pole member, forming a first coil segment over the first insulating layer, forming a second insulating layer over the first coil segment, forming a center tap element over the second insulating layer, forming a third insulating layer over the center tap element, forming a second coil segment over the third insulating layer, and forming a fourth insulating layer over the second coil segment, and (iii) forming a top pole member over the coil structure with portions of the top pole member coupled to corresponding portions of the bottom pole member to form a closed magnetic path with a leg portion surrounded by the coil structure; and
 (d) forming an electrically conductive coupling between the transducer and the transformer.

29. The method of claim 28 wherein said step (iii) of forming includes the steps of exposing the corresponding portions of the bottom pole member, and depositing a magnetically permeable material over the coil structure so that the top pole member includes magnetically permeable material contacting the exposed corresponding portions of the bottom pole member and extending between the exposed portions of the bottom pole member over the coil structure.

30. The method of claim 28 further including the step of providing a plurality of externally accessible contact pads over the substrate and coupled to the coil structure in a predetermined fashion.

* * * * *